United States Patent [19]

Tiedemann, Jr. et al.

[11] Patent Number: 5,999,816
[45] Date of Patent: Dec. 7, 1999

[54] METHOD AND APPARATUS FOR PERFORMING MOBILE ASSISTED HARD HANDOFF BETWEEN COMMUNICATION SYSTEMS

[75] Inventors: Edward G. Tiedemann, Jr.; Tao Chen, both of San Diego, Calif.

[73] Assignee: Qualcomm Incorporated, San Diego, Calif.

[21] Appl. No.: 08/816,746

[22] Filed: Feb. 18, 1997

[51] Int. Cl.$^6$ .................................................. H04Q 7/00
[52] U.S. Cl. ........................ 455/437; 455/436; 455/439; 455/440
[58] Field of Search ..................................... 455/436, 437, 455/438, 439, 442, 440, 441, 445, 432; 370/321

[56] References Cited

U.S. PATENT DOCUMENTS

| | | | |
|---|---|---|---|
| 4,901,307 | 2/1990 | Gilhousen et al. | 370/18 |
| 5,101,501 | 3/1992 | Gilhousen et al. | 455/33 |
| 5,239,676 | 8/1993 | Strawczynski et al. | 455/437 |
| 5,267,261 | 11/1993 | Blakeney, II et al. | 375/1 |
| 5,295,153 | 3/1994 | Gudmundson | 375/1 |
| 5,590,177 | 12/1996 | Vilmur et al. | 455/436 |
| 5,594,718 | 1/1997 | Weaver, Jr. et al. | 455/437 |
| 5,634,192 | 5/1997 | Meche et al. | 455/437 |
| 5,649,000 | 7/1997 | Lee et al. | 455/436 |
| 5,666,356 | 9/1997 | Flenning et al. | 370/328 |
| 5,682,380 | 10/1997 | Park et al. | 455/436 |
| 5,722,072 | 2/1998 | Chrichton et al. | 455/437 |
| 5,737,704 | 4/1998 | Jin et al. | 455/450 |
| 5,848,063 | 12/1998 | Weaver et al. | 455/436 |

FOREIGN PATENT DOCUMENTS

| | | | |
|---|---|---|---|
| 0406186 | 5/1990 | European Pat. Off. | H04Q 7/04 |
| 0421535 | 10/1990 | European Pat. Off. | H04Q 7/04 |
| 9612380 | 4/1996 | WIPO . | |
| 0719064 | 6/1996 | WIPO . | |

OTHER PUBLICATIONS

"Soft Handoff frame format" by Edward Tiedemann, TIA Document, Dec. 11–14, 1995, pp. 1–7.

"Alternative methods for Inter–Channel Handoff" by Charles Wheatley, TIA Document; pp. 1–3, Nov. 10–20, 1992.

"Proposed Draft Liaison Statement to TR.45.2" by Edward G. Tiedemann, Jr. TIA Document, pp. 1–32; Dec. 3–11, 1992.

"Intersystem Issues for Support of the Wideband Spread–Spectrum Digital Standard" by Gadi Karmi, TIA Document; Oct. 6, 1992, pp. 1–7.

"Cellular Radiotelecommunications Intersystem Operations: Authentication, Signaling Message Encryption and Voice Privacy" TIA/EIA Telecommunications Systems Bulletin, May 1993.

(List continued on next page.)

*Primary Examiner*—Edward F. Urban
*Assistant Examiner*—Thuan T. Nguyen
*Attorney, Agent, or Firm*—Russell B. Miller; Bruce W. Greenhaus; Kent D. Baker

[57] ABSTRACT

A method and apparatus for performing inter-system hard handoff between communication systems or inter-frequency hard handoff within a CDMA communication system is disclosed. The purpose of this invention is to reduce the probability of dropped calls during inter-system hard handoff. In the event that a hard handoff attempt is unsuccessful, the mobile station will return to the original system with information which the communication system of the present invention uses to assist in the performance of future handoff attempts. Alternatively, with no handoff attempt made, the mobile station monitors the destination system then returns to the original system with information used to assist in subsequent handoff attempts. The information returned from monitoring a CDMA system consists of results of a search for one or more pilots given at offsets in a specific list provided to the mobile station by the base station or a set of offsets based upon a predetermined search algorithm.

35 Claims, 10 Drawing Sheets

OTHER PUBLICATIONS

"Cellular Radiotelelcommunications Intersystem Operations: Intersystem Handoff" EIA/TIA Interim Standard, Dec. 1991.

"IS–41–B Mobile Border System Problems" TIA/EIA Telecommunications Systems Bulletin, Apr. 1994.

"IS–41–B Support for Dual–Mode Wideband Spread Spectrum Mobile Stations" TIA/EIA Telecommunications Systems Bulletin, Jan. 1994.

TIA document "CDMA Intersystem Operations" by Alejandro Holcman et al. Presented at IEEE Conference on Vehicular Technology committee, Stockholm, Sweden, Jun. 8, 1994.

TIA TR45.2 Intersystems Operations Presentation "The Wideband Spread Spectrum Standard Under Development in TR45.5" by Edward G. Tiedemann, presented din Atlanta, GA Nov. 16–20 1992.

TIA document "Intersystem Operation With The Proposed Wideband Spread Spectrum Dual–Mode Station–Base Station Compatibility Standard" by Gadi Karmi et al. presented May 1992 in Atlanta, GA.

MOBILE STATION

METHOD AND APPARATUS FOR PERFORMING MOBILE ASSISTED HARD HANDOFF BETWEEN COMMUNICATION SYSTEMS

BACKGROUND OF THE INVENTION

I. Field of the Invention

The present invention relates to communications systems. More particularly, the present invention relates to a novel and improved method for hard handoff between different wireless communication systems.

II. Description of the Related Art

In a code division multiple access (CDMA) spread spectrum communication system, a common frequency band is used for communication with all base stations within that system. An example of such a system is described in the TIA/EIA Interim Standard IS-95-A entitled "Mobile Station-Base Station Compatibility Standard for Dual-Mode Wideband Spread Spectrum Cellular System", incorporated herein by reference. The generation and receipt of CDMA signals is disclosed in U.S. Pat. No. 4,981,307 entitled "SPREAD SPECTRUM MULTIPLE ACCESS COMMUNICATION SYSTEMS USING SATELLITE OR TERRESTRIAL REPEATERS" and in U.S. Pat. No. 5,103,459 entitled "SYSTEM AND METHOD FOR GENERATING WAVEFORMS IN A CDMA CELLULAR TELEPHONE SYSTEM" both of which are assigned to the assignees of the present invention and incorporated herein by reference.

Signals occupying the common frequency band are discriminated at the receiving station through the spread spectrum CDMA waveform properties based on the use of a high rate pseudonoise (PN) code. A PN code is used to modulate signals transmitted from the base stations and the remote stations. Signals from different base stations can be separately received at the receiving station by discrimination of the unique time offset that is introduced in the PN codes assigned to each base station. The high rate PN modulation also allows the receiving station to receive a signal from a single transmission station where the signal has traveled over distinct propagation paths. Demodulation of multiple signals is disclosed in U.S. Pat. No. 5,490,165 entitled "DEMODULATION ELEMENT ASSIGNMENT IN A SYSTEM CAPABLE OF RECEIVING MULTIPLE SIGNALS" and in U.S. Pat. No. 5,109,390 entitled "DIVERSITY RECEIVER IN A CDMA CELLULAR TELEPHONE SYSTEM", both of which are assigned to the assignee of the present invention and incorporated herein by reference.

The common frequency band allows simultaneous communication between a remote station and more than one base station, a condition known as soft handoff disclosed in U.S. Pat. No. 5,101,501 entitled "SOFT HANDOFF IN A CDMA CELLULAR TELEPHONE SYSTEM" and U.S. Pat. No. 5,267,261 entitled "MOBILE STATION ASSISTED SOFT HANDOFF IN A CDMA CELLULAR COMMUNICATIONS SYSTEM", both assigned to the assignee of the present invention and incorporated herein by reference. Similarly, a remote station can be simultaneously communicating with two sectors of the same base station, known as softer handoff as disclosed in copending U.S. Patent Application entitled "METHOD AND APPARATUS FOR PERFORMING HANDOFF BETWEEN SECTORS OF A COMMON BASE STATION", Ser. No. 08/405,611, filed Mar. 13, 1995, assigned to the assignee of the present invention and incorporated herein by reference. Handoffs are described as soft and softer because they make the new connection before breaking the existing one.

If a mobile station travels outside the boundary of the system with which it is currently communicating, it is desirable to maintain the communication link by transferring the call to a neighboring system, if one exists. The neighboring system may use any wireless technology, examples of which are CDMA, NAMPS, AMPS, TDMA or FDMA. If the neighboring system uses CDMA on the same frequency band as the current system, an inter-system soft handoff can be performed. In situations where inter-system soft handoff is not available, the communication link is transferred through a hard handoff where the current connection is broken before a new one is made. Examples of hard handoffs are those from a CDMA system to a system employing an alternate technology or a call transferred between two CDMA systems which use different frequency bands (inter-frequency hard handoff).

Inter-frequency hard handoffs can also occur within a CDMA system. For example, a region of high demand such as a downtown area may require a greater number of frequencies to service demand than the suburban region surrounding it. It may not be cost effective to deploy all available frequencies throughout the system. A call originating on a frequency deployed only in the high congestion area must be handed off as the user travels to a less congested area. Another example is that of a microwave or other service operating on a frequency within the system's boundaries. As users travel into an area suffering from interference from the other service, their call may need to be handed off to a different frequency.

Handoffs can be initiated using a variety of techniques. Handoff techniques, including those using signal quality measurements to initiate handoff, are found in copending U.S. patent application Ser. No. 08/322,817 entitled "METHOD AND APPARATUS FOR HANDOFF BETWEEN DIFFERENT CELLULAR COMMUNICATIONS SYSTEMS", filed Oct. 16, 1994, assigned to the assignee of the present invention and incorporated herein by reference. Further disclosure on handoffs, including measurement of round-trip signal delay to initiate handoff, is disclosed in copending U.S. patent application Ser. No. 08/652,742 entitled "METHOD AND APPARATUS FOR HARD HANDOFF IN A CDMA SYSTEM", filed May 22, 1996, assigned to the assignee of the present invention and incorporated herein by reference. Handoffs from CDMA systems to alternate technology systems are disclosed in copending U.S. patent application Ser. No. 08/413,306 ('306 application) entitled "METHOD AND APPARATUS FOR MOBILE UNIT ASSISTED CDMA TO ALTERNATIVE SYSTEM HARD HANDOFF", filed Mar. 30, 1995, assigned to the assignee of the present invention and incorporated herein by reference. In the '306 application, pilot beacons are placed at the boundaries of the system. When a mobile station reports these pilots to the base station, the base station knows that the mobile station is approaching the boundary.

When a system has determined that a call should be transferred to another system via hard handoff, a message is sent to the mobile station directing it to do so along with parameters that enable the mobile station to connect with the destination system. The system has only estimates of the mobile station's actual location and environment, so the parameters sent to the mobile station are not guaranteed to be accurate. For example, with beacon aided handoff, the measurement of the pilot beacon's signal strength can be a valid criteria for triggering the handoff. However, the appropriate cell or cells in the destination system which are to be assigned to the mobile station (known as the Active Set) are not necessarily known. Moreover, including all the likely possibilities may exceed the maximum allowable in the Active Set.

In order for the mobile station to communicate with the destination system, it must lose contact with the old system. If the parameters given to the mobile station are not valid for any reason, i.e. changes in the mobile station's environment or lack of precise location information at the base station, the new communication link will not be formed, and the call may be dropped. After an unsuccessful handoff attempt, the mobile station can revert back to the previous system if it is still possible to do so. With no further information and no significant change in the mobile station's environment, repeated attempts to hand off will also fail. Thus, there is a need felt in the art for a method for performing additional hard handoff attempts with greater probability of success.

SUMMARY OF THE INVENTION

The purpose of this invention is to reduce the probability of dropped calls during inter-system hard handoff. In the event that a hard handoff attempt is unsuccessful, the mobile station will return to the original system with information which the is used to assist in the performance of future handoff attempts.

Prior to handoff, the original base station will have a rough estimate of the most likely base stations of a destination system to provide service to a mobile station as it travels into the destination system. In the exemplary embodiment, a message will be sent from the base station to the mobile station containing this list of neighboring base stations in the destination system, a minimum total received power threshold, and a minimum pilot energy threshold. When the base station in the original system has determined that a hard handoff is appropriate, it signals the neighboring base stations in the destination system to begin transmitting forward link traffic to the mobile station entering the system. A first hard handoff is attempted after a message is received by the mobile station from the base station initiating the inter-system hard handoff. The mobile station switches to the frequency of the destination system and attempts to acquire the base stations of the destination system in accordance with the acquisition parameters provided (i.e. the pilot PN offsets). If the minimum pilot energy threshold is exceeded, the handoff is deemed to be successful and the mobile station remains on the destination system.

If the minimum pilot energy threshold is not exceeded, recovery techniques begin. The mobile station measures the total in-band energy of the destination system and compares that to the total received power threshold. If the minimum total received power threshold is not exceeded, the handoff is abandoned immediately. The mobile station returns to the original system and reports that no significant power was detected at the new frequency. If the minimum total received power is exceeded, it is likely that the destination system is available, but that the neighboring base stations provided by the original system (referred to as the new Active Set) is not acceptable for communication. The mobile station then performs a search to locate viable pilot signals in the destination system. In general, a list of offsets to search provided to the mobile station will be sufficient to locate available pilots, although other search algorithms can be employed. Upon completion of the search, the mobile station returns to the original system and reports the failure and any pilot signals found in the search which exceeded a third threshold.

If no significant received power was detected or there were no pilots found in the search, the system controller can opt to delay a second attempt at handoff in hopes of a beneficial change in the mobile station's environment. In the alternative, the mobile station can abandon the hard handoff attempt altogether, which would likely result in the eventual dropping of the call. However, in those cases where the destination system is present, the system controller can update the Active Set based on the returned search information, and the destination system can modify the base stations transmitting to the mobile station accordingly. Then a second hard handoff attempt message can be sent to the mobile station. Unless the environment has changed, this second attempt is likely to be successful.

In the preferred embodiment, the mobile station following an incomplete handoff attempt or failure to detect sufficient signal strength in the new system, tunes to the new systems at predetermined time intervals and conducts the search for signals of sufficient strength or performs additional handoff attempts.

In the preferred embodiment of the present invention, the mobile station is provided with two sets of acquisition parameters in the new system. The first set set the set identifies the base stations that will comprise the mobile station's neighbor set in the new system should handoff to the new system be successful. A subset of that list will be the set of base stations the mobile station will search by measuring received signal energy therefrom. This greatly reduces the amount of time required to effectively perform the search which provides the mobile station with sufficient information to assure successful operation should handoff to the new system be successful.

In addition, the present invention contemplates the problems associated with the control of transmission power of both the base station and the mobile station that results from the mobile station tuning to the new frequency. The present invention discloses response measures to handle the problems with power control that result from the tuning to new frequency.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
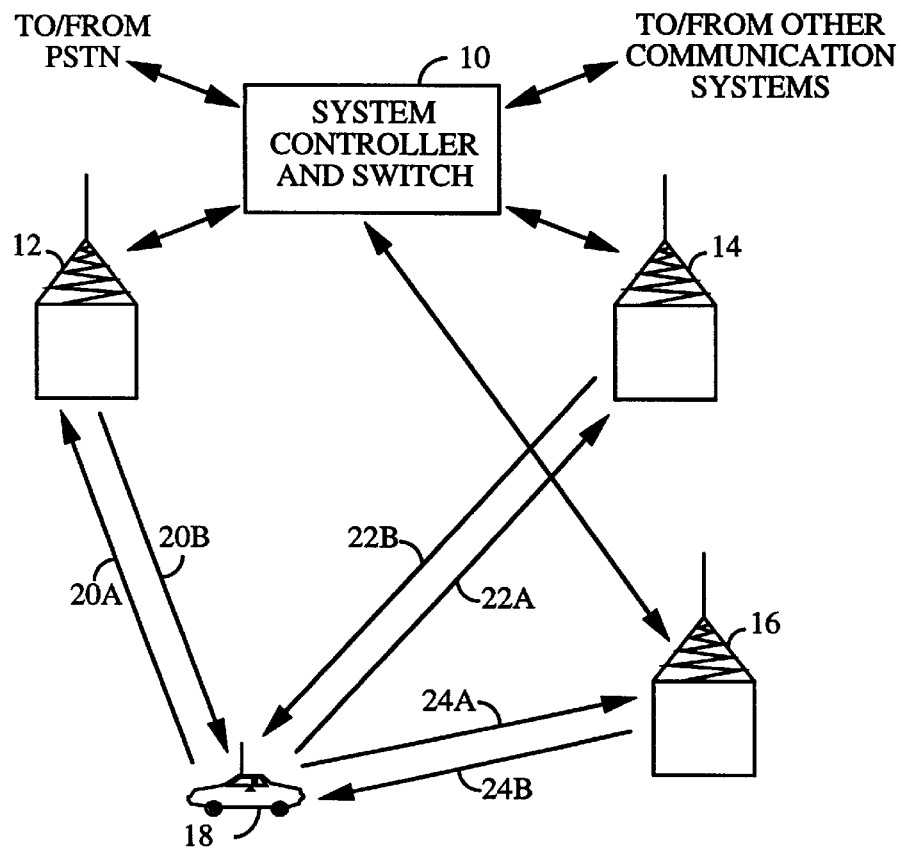
FIG. 1 is a schematic overview of an exemplary spread spectrum CDMA communications system in accordance with the present invention.

FIG. 1 depicts an embodiment of a communication system employing the present invention. A typical CDMA communications system consists of a system controller and switch 10 in communication with one or more base stations, examples of which are 12, 14, and 16. System controller and switch 10 also connects with the Public Switched Telephone Network (PSTN) (not shown) and with other communication systems (not shown). Mobile station 18 is an example subscriber with forward links 20B, 22B, and 24B, and reverse links 20A, 22A, and 24A. The system controller and switch 10 controls soft handoffs and inter-frequency hard handoffs within the system, and in conjunction with neighboring systems controls inter-system soft handoff as well as inter-system hard handoffs. The exemplary embodiment of the present invention deals with CDMA system to CDMA system inter-frequency hard handoffs. It will be understood by one skilled in the art that the teachings of the present invention can be applied to handoffs using multiple access schemes and for handoff between systems using different modulation schemes.

Figure 2:
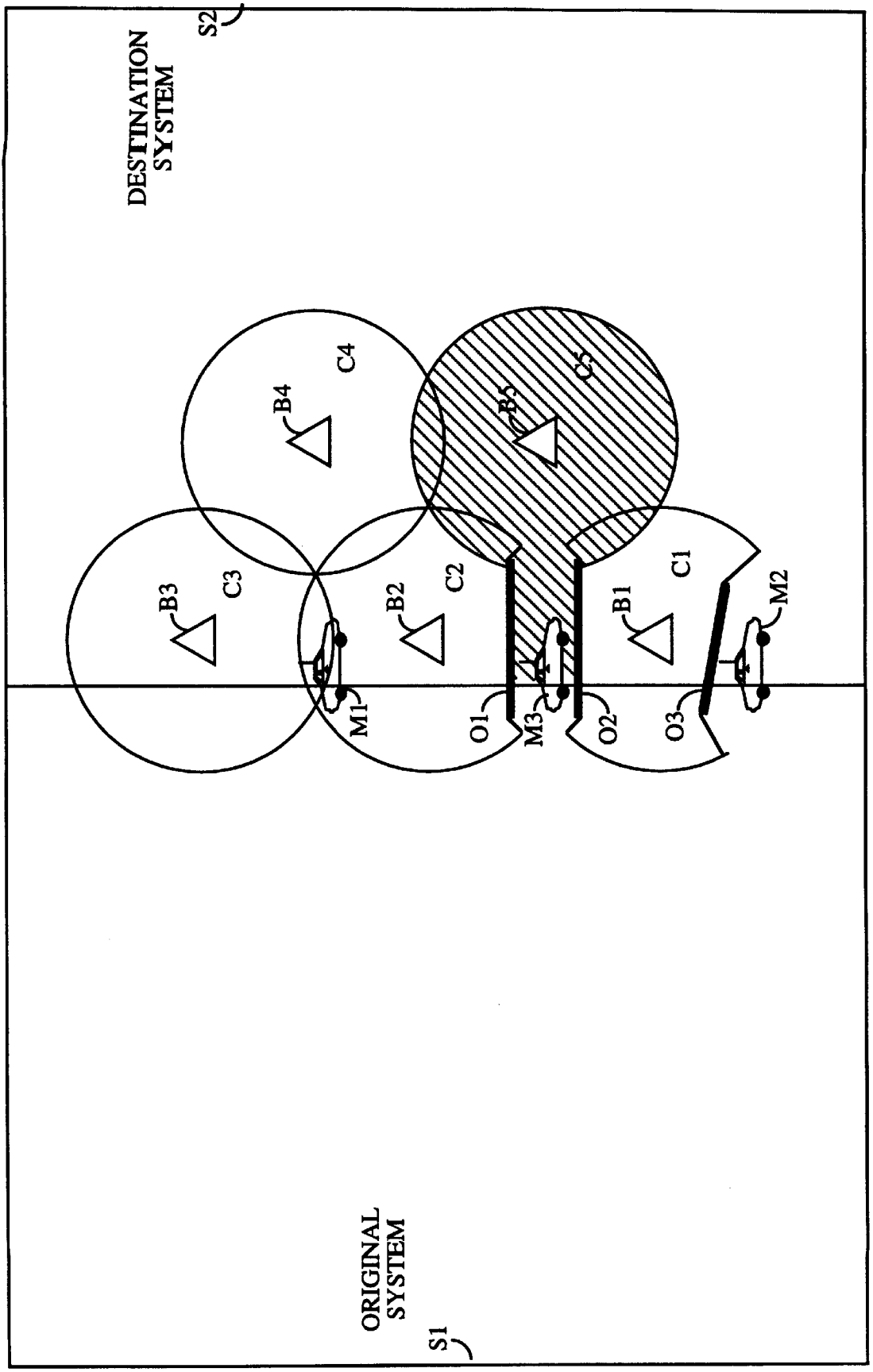
FIG. 2 is a representation of example scenarios whereby the various situations responded to by this invention can be described.

FIG. 2 depicts three different scenarios possible in the use of the present invention. Three mobile stations, M1, M2, and M3 are traveling from the system where their respective calls originated, S1, to a neighboring system of differing frequency, S2. Initially, all the mobile stations M1–M3 are in communication with one or more base stations (not shown) in system S1. As each mobile station travels across the boundary of S1 into S2, a hard handoff attempt will be made. The destination system, S2, contains base stations B1–B5 each which cover a cell area C1–C5, respectively. System S2 may have other base stations (not shown) which do not affect the scenarios given. As shown, some cells intersect with other cells. In that overlapping region, a mobile station can be in communication with either base station or both simultaneously if the mobile station is in soft handoff. Also shown are obstructions O1–O3. These obstructions distort the coverage areas that otherwise would be circular shaped cells. Cell C5 is shown shaded to clearly indicate its unusual shape.

Consider first mobile station M1. This is an example of a case which would result in a successful hard handoff in both a prior art system and a system embodying and the current invention. As M1 approaches the S1–S2 border, origination system S1 predicts the likely neighbors in destination system S2, based on its best guess of the location of M1. S1, through a base station in contact with M1 (not shown) then notifies M1 of the PN offsets of cells in the destination system S2, for example C1, C2, C3, C4, and C5. In the exemplary embodiment, S2 also sends parameters for minimum total received pilot, MIN_TOT_PILOT, and minimum received power, MIN_RX_PWR. In an alternative embodiment, M1 may store values of MIN_TOT_PILOT and MIN_RX_PWR or may be capable of generating the values based on system data. S1 then begins forwarding traffic to system S2 with instructions to set up the appropriate forward link for that data directed to mobile station M1 on base stations B2 and B3. Base stations B2 and B3 are the most likely target base stations and are in the new Active Set. Then S1 sends an initiation message to mobile station M1 to begin the hard handoff process. Owing to the benign propagation environment in the vicinity of mobile station M1, when M1 switches to the new frequency, it will find the pilots and successfully demodulate forward link traffic from the new Active Set, base stations B2 and B3, as predicted by system S1. M1 determines the hard handoff to be successful because the total received pilot exceeds the threshold MIN_TOT_PILOT. M1 notifies S2 of its successful handoff. System S1 will deallocate resources previously assigned to communicate with mobile station M1 after it is determined that the hard handoff was successful. This determination may be made by receipt of a message from system S2, or based on a prearranged time duration in which no further communication takes place between system S1 and mobile station M1.

Next, consider mobile station M2, which is in an area of inadequate coverage by S2, often referred to as a hole. As mobile station M2 approaches the S1–S2 border, system S1 predicts that coverage in system S2 is provided in cell C1. The handoff is initiated in the same manner as described above. However, upon switching to the frequency of destination system S2, significant signal energy is not received by mobile station M2 due to the obstruction O3. That is, total received pilot is less than the threshold MIN_TOT_PILOT. In prior systems, this call would be dropped. In the present system, the mobile station begins recovery techniques.

Once the mobile station determines that the pilot or pilots predicted by S1 are not available, M2 measures the total received power in the new frequency band and compares it to threshold MIN_RX_PWR. In this example, the only transmitter near M2 is base station B1 and its signal is blocked by obstruction O3, so no significant energy is found in the frequency band of the destination system. Mobile station M2 then abandons the handoff and returns to system S1, notifying it that no system S2 was found. Assume mobile station M2 continues traveling away from system S1. Since the call was not dropped, as would have been the case using current methods, a number of options exist. At minimum, the call can continue on system S1 until it eventually drops because the distance has become too great. Given that the mobile station environment is susceptible to change, a second handoff attempt after a delay may be successful.

Finally, consider mobile station M3. In like manner to mobile stations M1 and M2 handoff procedures are initiated with cells C1 and C2 being the predicted new Active Set. Due to obstructions O1 and O2, neither predicted cell is available to mobile station M3, hence MIN_TOT_PILOT is not exceeded. Again recovery procedures begin. This time base station B5 is within range, however its offset is not in the new Active Set, nor is it transmitting forward link data directed to M3. As such, although the predicted cells are not available, the minimum received power threshold, MIN_RX_PWR, is exceeded. Since the destination system appears to be available, a search for available pilots is performed. When the search is complete, mobile station M3 returns to system S1 and notifies it of the failed handoff attempt as well as the available pilots, in this case the pilot for cell C5. S1 sends a message to destination system S2 to set up a forward link on base station B5, then a second attempt at handoff can be made. If the environment has not changed substantially, the second time M3 switches to the new frequency, the call will successfully hand off to base station B5 of destination system S2.

Figure 3:
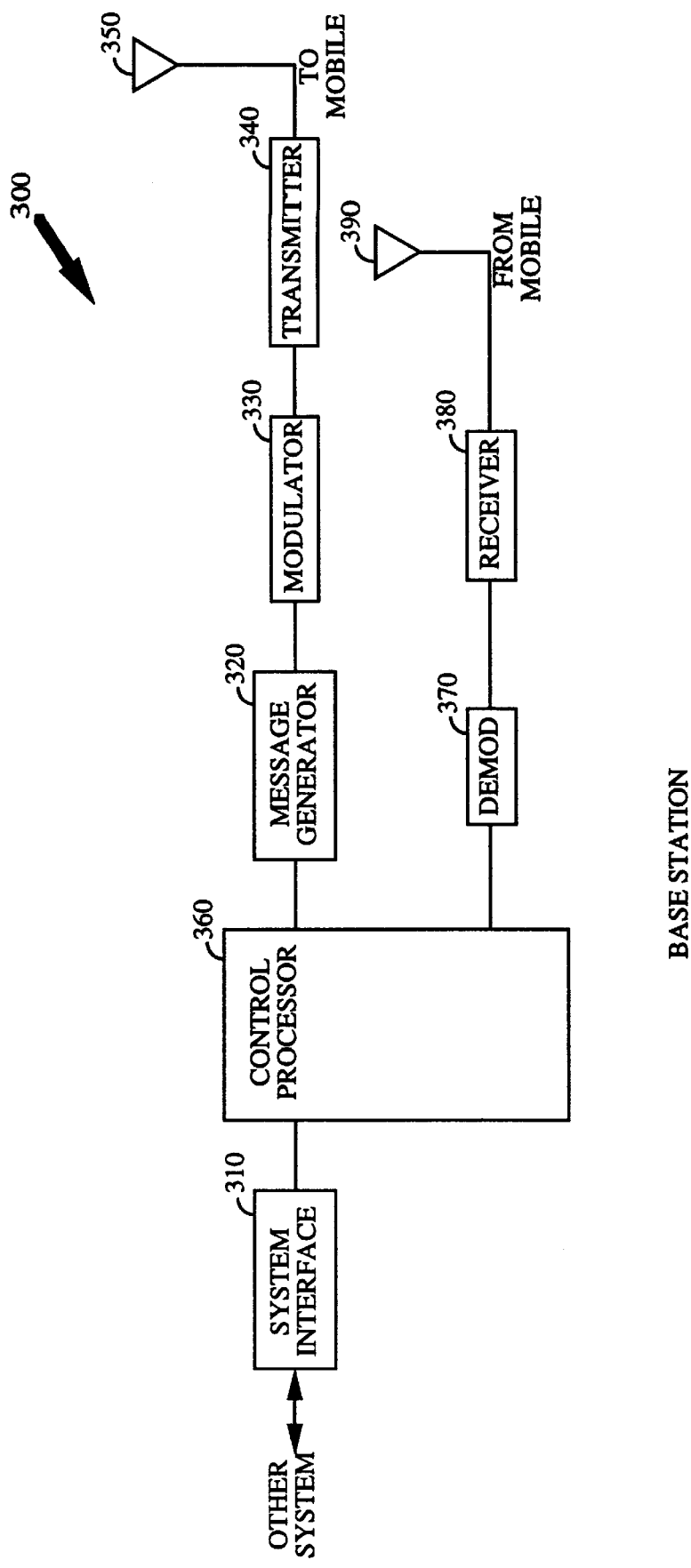
FIG. 3 is an illustration of an exemplary base station.

FIG. 3 depicts an exemplary base station. Base station 300 communicates with other systems (not shown) and with system controller and switch 10, shown in FIG. 1, through system interface 310. Inter-frequency handoff is a distributed process, with system controller and switch 10 signaling with the other switch, and base station 300 handling some of the handoff details. System controller 10 determines, in conjunction with base station 300, that an inter-system hard handoff is necessary. There are many alternatives for handoff determination as described above, including mobile station location or pilot beacon reception. The destination system (not shown) is instructed by the origination system to begin transmitting forward link traffic on the destination system's frequency from a select set of base stations. A database (not shown) in control processor 360 may contain the candidate base stations. Alternatively, a suitable list of handoff base station candidates can be returned from the destination system to control processor 360 through system interface 310. In situations where the destination system is not a CDMA system, other parameters useful for acquiring the destination system can be delivered to control processor 360 through system interface 310.

Parameters and instructions from control processor 360 are formed into messages in message generator 320. Those messages are modulated in modulator 330 and sent to the mobile station through transmitter 340 and antenna 350. In the exemplary embodiment, modulator 330 is a CDMA modulator as described in the aforementioned U.S. Pat. Nos. 4,901,307 and 5,103,459. In the exemplary embodiment, the list of neighbor base stations, MIN_TOT_PILOT, and MIN_RX_PWR are combined into a single message, referred to herein as the Other Frequency Neighbor List Message (OFNLM). In addition, in a preferred embodiment, the OFNLM contains a parameter indicating the size of the search window which is to be used to locate pilots on the new system. The base station to mobile station message that signals the mobile station to begin attempting to acquire the destination system contains the destination system Active Set and is called the Extended Handoff Direction Message (EHDM). Additional parameters are envisioned that could be sent to the mobile station to facilitate improved hard handoff in the event of a handoff attempt failure. For example, a specific list of offsets to search, a range of offsets to search, or a specific search algorithm such as searching offsets in increments of 64 chips away from those offsets attempted from those of the base stations listed in the OFNLM.

Following a failed hard handoff attempt, the mobile station will follow the instructions as given, then return to the original system to communicate its findings. Reverse link signals from the mobile station to base station 300 are received through antenna 390, downconverted in receiver 380, and demodulated in demodulator 370 under control of control processor 360.

Figure 4:
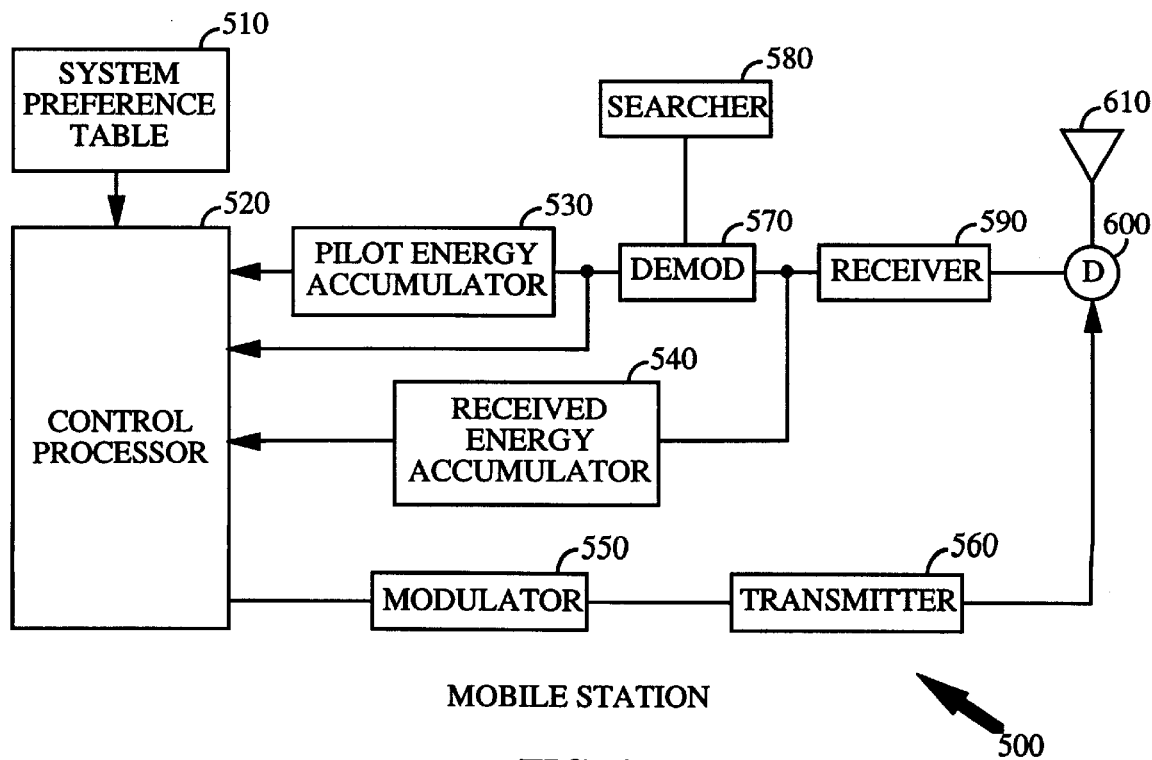
FIG. 4 is an illustration of an exemplary mobile station.

FIG. 4 depicts an exemplary mobile station 500. Messages arrive at control processor 520 from base station 300 through antenna 610, duplexer 600, receiver 590 and demodulator 570. In the exemplary embodiment, receiver 590 is a CDMA modulator as described in the aforementioned U.S. Pat. Nos. 4,901,307 and 5,103,459. Upon receipt of the EHDM message from base station 300, control processor 520 directs receiver 590 and transmitter 560 to tune to the frequency of the destination. At this point, the communication link with the original system has been broken. Control processor 520 directs demodulator 570 to attempt to demodulate pilots at the offsets in the Active Set as given by base station 300 in the EHDM. The energy in the signals demodulated with those offsets is accumulated in pilot energy accumulator 530. Control processor 520 uses the results of the accumulation to compare to MIN_TOT_PILOT. If MIN_TOT_PILOT is exceeded, the handoff is deemed successful. If MIN_TOT_PILOT is not exceeded, recovery operations begin. Alternatively, a requirement of receiving some number N good frames (no CRC errors) within a specific time T can be used to determine if the handoff attempt is successful.

The first step following an unsuccessful hard handoff attempt is to determine if the destination system is available. Received energy accumulator 540 accumulates the total power received in the destination system's frequency band and provides the result to control processor 520. Control processor 520 compares those accumulation results with the threshold MIN_RX_PWR. If MIN_RX_PWR is not exceeded, the handoff attempt is aborted. Receiver 590 and transmitter 560 are retuned to the original frequency and control processor 520 generates a message that notifies base station 300 that the handoff attempt failed and the destination system was not found to be significantly present. The message is provided to modulator 550 which modulates the message and provides the modulated signal through transmitter 560, duplexer 600, and antenna 610 for transmission.

Mobile station 500 contains system preference information stored in system preference table 510. If the destination system is not present, mobile station 500 may send alternate system information to base station 300, so that mobile station 500 may attempt to acquire a different system on the next hard handoff attempt For example, a neighboring region may be covered by multiple systems, which may include a combination of CDMA systems as well as systems of alternate technologies. System preference table 510 may be programmed such that if a first preferred system is not available, acquisition of a second system is attempted. There may be additional systems upon which to attempt handoff, should the second system be unavailable. Handoff attempts can be made in a prioritized order until acquisition has been attempted on all candidate systems.

If MIN_RX_PWR is exceeded, indicating that the destination system is available, mobile station 500 proceeds as previously instructed. In the exemplary embodiment, searcher 580 conducts a search to locate pilot offsets where base stations in the destination system are available. To perform a search, searcher 580 generates the PN sequence with a specific offset. Demodulator 570 correlates the incoming data with the offset PN sequence. Pilot energy accumulator 530 measures the pilot energy for that offset by accumulating samples for a predetermined time interval. Control processor 520 compares that result to a threshold, called T_ADD, to determine whether a pilot is available for that offset. Searcher 580 then moves to the next offset candidate. The process repeats until there are no more candidate offsets to measure. The search operation process is described in detail in copending U.S. patent application Ser. No. 08/509/721 entitled "METHOD AND APPARATUS FOR PERFORMING SEARCH ACQUISITION IN A CDMA COMMUNICATION SYSTEM", filed Jul. 26, 1996, which is assigned to the assignee of the present invention and incorporated by reference herein. Alternate search algorithms can be substituted in searcher 580 without modification to the present invention.

The search subsequent to the hard handoff failure may be performed over all possible offsets or a subset thereof. For example, a range of offsets may be searched. In the exemplary embodiment, the OFNLM contains the subset of offsets to be searched. In the exemplary system, neighboring base stations are separated by integer multiples of 64 chips. If one base station offset in the system is known (even if it is not currently available), only offsets that are integer multiples of 64 from that known offset need to be searched in order to attempt acquisition on the complete set of neighbor base stations. A combination of spaced offsets in a specific range or number of ranges can also be searched.

When the destination system is an alternate technology, there may be different procedures to perform which will yield information that will improve subsequent hard handoff attempts. For example, when the destination system is TDMA, the mobile station may measure the in band energy at a plurality of frequency subbands and report this information to the origination system. Or in the case of a neighboring AMPS system, the base station can send an OFNLM specifying frequencies for the analog control channels. However, it may not be necessary to send the frequencies of the control channels if they are already known. In that case, if the mobile station finds the voice channel to which it was handed off is too weak, the mobile station can proceed to measure the received power on the analog control channels. It may also determine the digital color code (DCC) for the control channel. The DCCs provide better determination of the cell in case the mobile station might be able to receive multiple cells in an area. The frequencies and DCCs of the strongest analog base stations can be returned as information to assist with a subsequent handoff attempt. Further discussion of the use of DCCs can be found in chapter 3 of "Mobile Cellular Telecommunications Systems" by William C. Y. Lee.

After mobile station 500 completes the requisite tasks, receiver 590 and transmitter 560 are retuned to the original frequency and control processor 520 notifies base station 300 through modulator 550, transmitter 560, duplexer 600, and antenna 610 that the handoff attempt failed and delivers any information that has been discovered during subsequent system search procedures.

Figure 5:
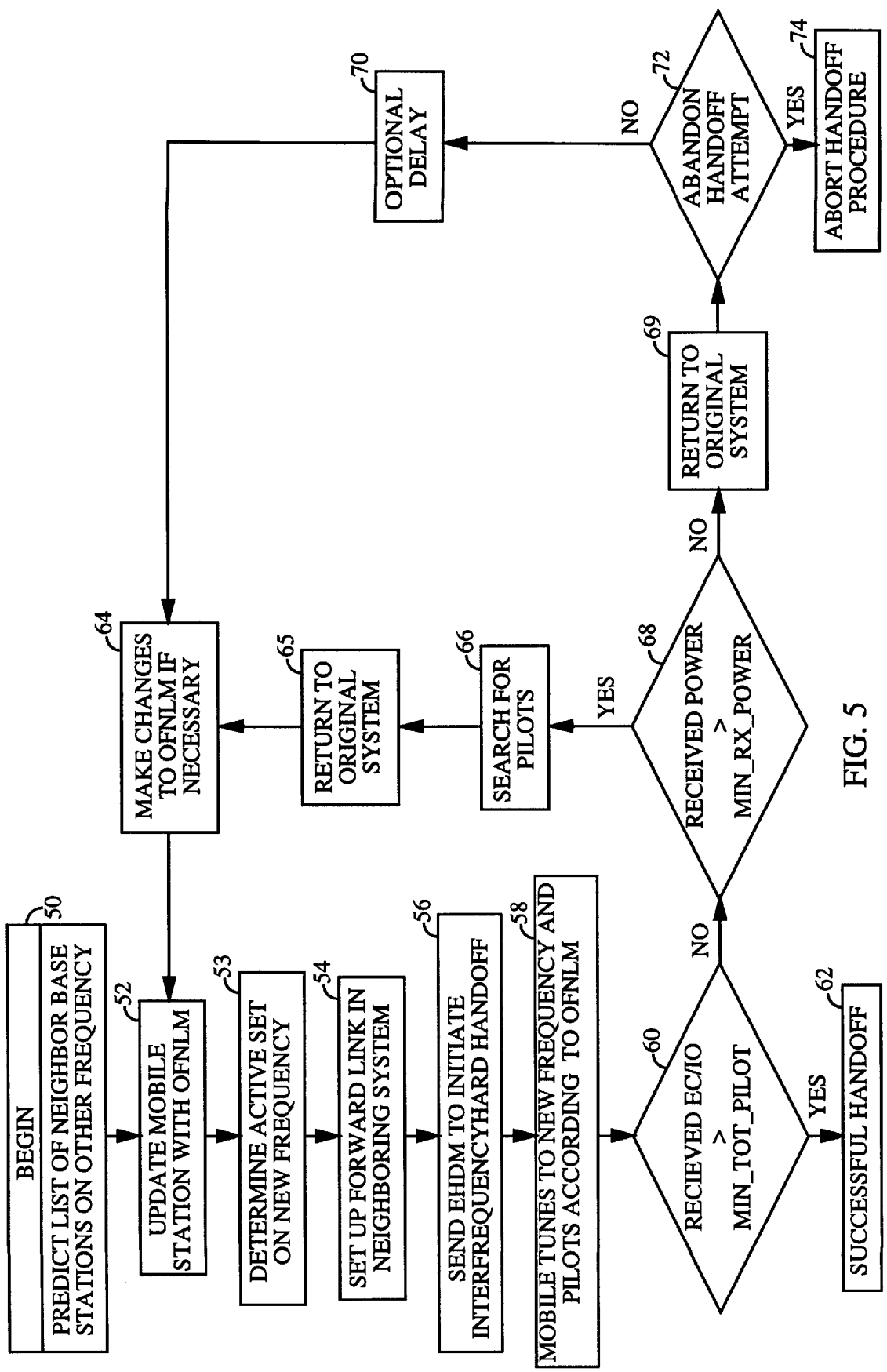
FIG. 5 is a flow chart illustrating the operation of the present invention.

The flow chart in FIG. 5 illustrates operation of the preferred embodiment of this invention. After determining that a handoff is imminent, the origination system predicts the list of neighbor base stations on the neighboring system's frequency in box 50. Proceed to 52, a base station in the origination system sends to the mobile station the Other Frequency Neighbor List Message (OFNLM) described above. In block 53, the Active Set for the new frequency is determined. In block 54, the destination system sets up the forward link as specified in the Extended Handoff Direction Message (EHDM). In block 56, the base station in the origination system sends the Extended Handoff Direction Message (EHDM) to the mobile station to initiate the inter-frequency hard handoff. Following that message, in 58, the mobile station tunes to the new frequency and attempts to acquire the destination system according to the Active Set information in the EHDM message.

In block 60, the mobile station measures the pilot energy, the sum of the energy of all pilots in the Active Set, and if the received total pilot energy exceeds that of parameter MIN_TOT_PILOT, proceed to 62, a successful hard handoff has occurred. The exemplary embodiment envisions that a mobile station is capable of being handed off directly into a soft handoff condition in the destination system, although that is not a requirement. A single pilot in the new Active Set whose received pilot energy exceeds that of parameter MIN_TOT_PILOT is sufficient for a successful handoff.

From 60, if MIN_TOT_PILOT is not exceeded, proceed to 68. In 68, if total received power in the frequency band exceeds parameter MIN_RX_PWR indicating the general presence of the destination system, proceed to 66, otherwise go to 69.

An alternative embodiment would be to check total received power before pilot energy. If the MIN_RX_PWR threshold is not exceeded, the handoff is aborted. This may be faster in some implementations.

In 66, search the possible offsets for available pilot signals. Any alternate search strategy can be performed here as well. When search is complete, proceed to 65. The mobile station returns to the original system in 65, then proceeds to 64. In 64, make necessary changes to OFNLM and return to 52, where the operation proceeds as described above.

In 69, the mobile station returns to the original system, then proceeds to 72. From 72, the decision can be made to continue attempting handoff by proceeding to 70, or the handoff procedure can be aborted by proceeding to 74. An optional delay is introduced in 70, then proceed to 64.

In an alternative embodiment of the present invention, the base station sends the mobile station an extended list of base stations which may be available at the point in which the mobile station is entering the destination system. In this alternative embodiment, no forward links are immediately set up in the destination system. Rather the mobile station simply determines whether the strength of any of the signals provided by any of the extended list of candidate systems are adequate to support a communication link. The mobile station monitors the forward link signals of each of the base stations in the extended list of candidate base stations.

After monitoring the signal strength of each of base stations in the extended list of candidate base stations, the mobile station necessarily returns to the original system and sends a message indicating the signal strength of the forward links of the candidate base stations. In the exemplary embodiment, the mobile station compares the strength of the signals received by each of the base stations in the extended list to a predetermined threshold T_ADD and reports only whether the measured signal power is above or below the threshold.

The base station of the original system receives the information regarding the signal strength of each of the base stations in the destination system and from this information the base station of the original system generates an Active Set list. This list is provided to the destination system which sets up forward links for the mobile station in accordance with the Active Set list provided by the original system. The base station of the original system transmits the active list to the mobile station which attempts to acquire the base stations in the active list and, if acquisition is successful, transmission to the mobile station is available without interruption.

Referring to FIG. 2, the alternative embodiment will be described in terms of acquisition of mobile M3. When original system S1 determines that mobile M3 should begin hard hand off operations to destination system S2, the base station in original system S1 which is currently in communication with mobile station M3 generates an extended list of base stations in S2 which the mobile station may be able to acquire. In the exemplary embodiment, the extended candidate list would likely consists of the parameters necessary to perform a search on all of base stations B1, B2, B3, B4 and B5, as well as additional base stations in destination system S2 (not shown). Note in the alternative embodiment, no information regarding M3 has, as of yet, been provided to the destination system S2.

Mobile station M3 tunes to the frequency of destination system S2 and measures the energy on each of the pilot channels of the base stations in the extended candidate list. In the example of mobile station M3, the mobile station would transmit back a message to the base station on the original system S1 a message indicating that acquisition upon base station B5 was possible. In response to this message, the base station in the original system would generate an Active Set list consisting solely of base station B5.

The base station in the original system would send a message to the destination system S2, indicating that a forward link for the mobile station M3 should be provide on base station B5. In response to this message, the destination system S2 sets up a forward link for mobile station M3 on base station B5. The Active Set list is sent to mobile station M3. In response to the Active Set message, mobile station M3 attempts acquisition of base station B5.

Referring to FIG. 3, base station 300 of the original system generates an extended candidate list in message generator 320 and provides the message to modulator 330. The message is modulated by modulator 330 and provided to transmitter 340 which upconverts and amplifies the signal and transmits the resulting signal through antenna 350.

Referring to FIG. 4, the transmitted signal is received by mobile station 500 by antenna 610 and is downconverted, filtered and amplified by receiver 590. The received signal is then demodulated by demodulator 570 and provided to control processor 520. Control processor 520 then generates a set of commands directing a search to be performed by searcher 580. Searcher 580 provides a set of search demodulation parameters to demodulator 570. The demodulated signals are provided to pilot energy accumulator 530 which measures the strength of the pilots of the base stations of the extended candidate list. The energy of each of these candidates is provided to control processor 520 which compares the measured energy with a threshold T_ADD. Control processor 520 generates a message which signifies which, if any, of the candidate base station's signals exceed the threshold.

The message is provided to modulator 550 where it is modulated. The modulated signal is then provided to transmitter 560 where it is upconverted, amplified, and transmitted through antenna 610.

Referring back to FIG. 3, the message indicating the strengths of the candidate base stations is received by antenna 390 of base station 300 of the original system. The signal is downconverted and amplified by receiver 380 and provided to demodulator 370. Demodulator 370 demodulates the signal and provides the result to control processor 360. Control processor 360 generates an Active Set list for the destination system in accordance with the information in the message transmitted by mobile station 500 indicating the results of its search. In the exemplary embodiment, the Active Set list will consist of all base stations whose signals, when monitored by mobile station 500, exceeded the energy threshold T_ADD.

Control processor 360 sends the Active Set list to system interface 310 which sends a message indicating the Active Set list to the destination system S2. Capacity issues allowing, destination system S2 provides forward link channels on each of the systems in the Active Set list.

Control processor 360 also provides the Active Set list to message generator 320. The resulting message is modulated by modulator 330 and transmitted as described above.

Mobile station 500 receives the message by antenna 610, demodulates the signal as described above, and provides the message to control processor 520. Control processor 520 then provides information regarding the Active Set list to demodulator 570 and receiver 590 and a hard handoff to the destination system S2 is attempted using the parameters of the base stations in the Active Set list. It should be noted that because, in this example, the active list was determined by mobile station 500, the mobile station need not receive the Active Set list, since it knows the station on the list apriori. Thus, in an alternative, embodiment, the mobile station may delay a predetermined time period and perform handoff to the base stations who's signals exceeded the threshold. If, on the other hand, the Active Set is not simply a copy of the base stations which exceeded the threshold but rather also takes into account parameters unknown to the mobile station, such as capacity parameters of S2, then transmission of the message would prove of value.

In a variation on the above described alternative embodiment, the mobile station periodically tunes to the new frequency and measures the offsets supplied in the OFNLM without direction from the base station. The period may be specified in the OFNLM. After the search is complete, the mobile station returns to the origination system and reports its findings. This information gained by polling the neighboring system can be used to determine the Active Set for a subsequent handoff attempt, as well as to assist in determining whether to initiate a handoff to that system.

Figure 6:
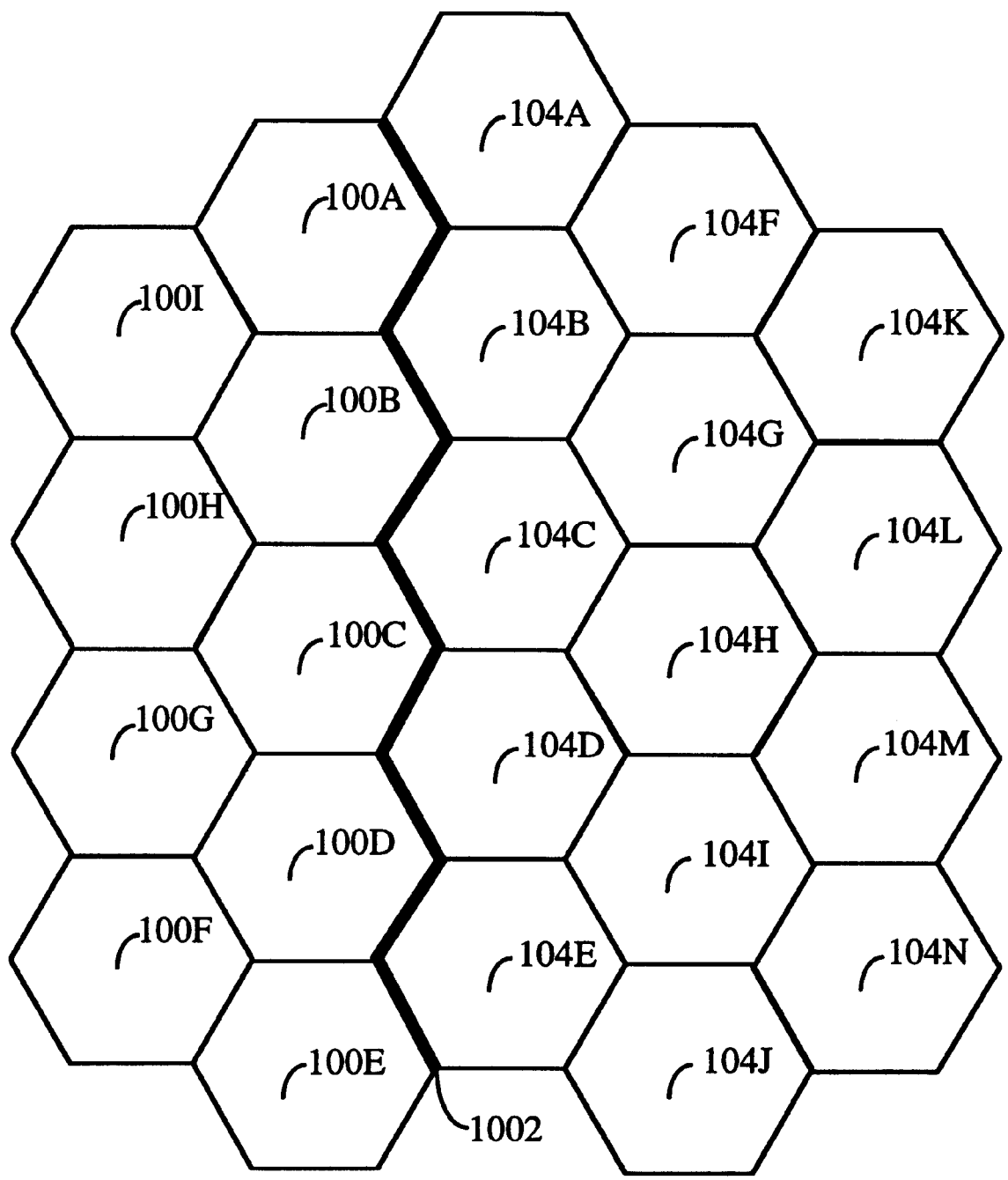
FIG. 6 is an illustration of cells in two networks.

Referring to FIG. 6, a first set of cells 1000A–1000I transmit on a first frequency (F1). A second set of cells 1004A–1004N transmit on a second frequency (F2). The border between the two sets of cells is illustrated with a thick black line 1002. In the preferred embodiment, when the mobile station is in communication with the cells on the border between the cells transmitting on F1 and the cells transmitting on F2 cells 1000A–1000E, the other frequency neighbor list message (OFNLM) is transmitted to the mobile station. In FIG. 6, the systems are adjacent and exclusive. However the teachings of the present invention are equally applicable to the case in which the two systems overlap, such is the case where the second system provides service or coverage to an area within the coverage region of the first system.

As described earlier, the OFNLM mobile station a set of acquisition parameters for cells in frequency F2. In the preferred embodiment, the cells in the OFNLM (less those cells which comprise the new active set) will become the neighbor set for the mobile station upon successful handoff to F2. In addition, the OFNLM contains the threshold values MIN_TOT_PILOT and MIN_RX_PWR. In addition, in the preferred embodiment, the OFNLM contains a timer value indicating how long the mobile station will remain on the new system without receiving a good frame, before it returns to the old system, a period indicating the frequency with which the mobile station will search the new system and search window size all of which are described in greater detail later herein.

In the preferred embodiment, the OFNLM will include an additional flag referred to herein as the RETURN_IF_FAIL flag. The RETURN_IF_FAIL flag tells station the mobile station the action it is to take should a handoff to the new frequency not be completed. The mobile station will not complete a handoff to the new frequency, if the mobile station is provided an empty active set in the EHDM, if there is insufficient inband energy in the new frequency F2 or the if active set pilots specified in the EHDM are not received with sufficient signal strength to provide communications to the mobile station or the mobile station is unable to receive a good frame of data on the new system within a timer period. If the RETURN_IF_FAIL flag has a value of "1", then the mobile station will return to the first system (F1) if the handoff attempt to the new frequency is not completed. If the RETURN_IF_FAIL flag has a value of "0", then the mobile station will not return to the first system (F1) regardless of the success of the handoff attempt.

In the exemplary embodiment of a CDMA to CDMA handoff, the acquisition parameters consist of the PN offsets for the cells. In the preferred embodiment, the OFNLM additionally indicates a subset of the cells indicated in the OFNLM that should be searched. For example, when a mobile station enters cell 1000C, cell 1000C may transmit an OFNLM which specifies the PN offsets for cells 1004A–1004N. These cells are the cells that will make up the mobile station's neighbor list, should the mobile station successfully handoff to the new frequency F2. As described in detail in IS-95 and in the aforementioned U.S. Pat. No. 5,267,261, the neighbor list is a set a cells which are intermittently searched to determine whether they are capable of communication with the mobile station and is typically based on physical location of the mobile station.

The problem with only specifying the neighbor set is that the number of cells to be used in a neighbor set is sufficiently large to require an unacceptably long time period in which to search all of its members. For example, a neighbor set can typically consist of up to 20 members. Under the standards specified in IS-95, a mobile station can take up to 30 ms per pilot to search. Thus, if the mobile station searches a neighbor set of 20 cells, the search can take 600 ms. This would search would result in losing thirty 20 ms frames of data transmitted on the first frequency (F1), not including the time to tune to the new frequency and retune to the old frequency, since while the mobile station is searching on the second frequency (F2) it is unable to receive data on the first frequency (F1). It is envisioned that the search time will ultimately be reduced, so that a plurality of pilots can be searched within a 20 ms time period.

In order to reduce the impact on the frame error rate that results from searching for cells on the second frequency, the present invention proposes providing an indication of a subset of the cells in the neighbor list which are to be searched. In the exemplary embodiment, the OFNLM includes a binary digit preceding the pilot offset which indicates whether the pilot is to be searched during the current search interval. Returning to the example where the mobile station is in cell 1000C and the neighbor list of cells in the OFNLM contains cells 1004A–1004N, the subset of cells which the mobile station is requested to search may include cells 1004C, 1004D, 1004G, 1004H and 1004I, which would proportionally reduce the period required to search the pilots. This method would provide a minimum impact on the likelihood of successful detection of base stations in the new frequency capable of providing communications with the mobile station, while still providing a complete neighbor list to the mobile station should the handoff attempt be successful.

In the EHDM the base station can specify a subset of cells to be searched which are the cells of the ACTIVE SET in frequency F2. These cells are cells which are currently set up to transmit data to the mobile station. Thus, if the mobile station detects sufficient signal strength for these cells, communications with these cells can commence immediately. ACTIVE SET may also be the empty set, in which case the mobile station necessarily returns to the old frequency upon completion of its search. Thus, in the example above, where the mobile station has been provided with the neighbor list consisting of cells 1004A–1004N, and the list of cells to search consisting 1004C, 1004D, 1004G, 1004H and 1004I, the base station controller which controls the operation of cells 1000A–1000I may send a message to the base station controller controlling the operation of cells 1004A–1004N requesting that communication links for the mobile station be set up on cells 1004C and 1004D. If the base station controller controlling the operation of cells 1004A–1004N accepts the request, it sets up the requested communication links and begins transmitting data to the mobile station, thus the ACTIVE SET in the frequency F2 consists of cells 1004C and 1004D.

Thus, there are three interrelated sets of cells of interest to the mobile station. The largest set of cells is the neighbor set which the mobile station will use upon successful handoff to the new frequency. A second set consists of a subset of the neighbor set cells which will be searched by the mobile station. The third set consists of a subset of the cells to be searched which are cells setup to immediately provide communication with the mobile station upon successful handoff to the frequency F2.

When a handoff is not completed and the RETURN_IF_FAIL flag is set to "1", the mobile station upon return to the first frequency, transmits a modified handoff complete message (HCM) In the exemplary embodiment, the modified HCM includes the measured received in band energy in the new frequency F2, if the mobile station has returned because the measured in band energy was less than the threshold value MIN_RX_PWR. If the mobile station has returned because either the combined pilot strengths of the ACTIVE SET is less than the threshold value MIN_TOT_PILOT_EC_I0 or because the active set in the OFNLM contained was the empty set, then the HCM additionally includes the measured $E_c/I_o$ for pilots with signal strength of pilots searched which had measured energies in excess of T_ADD. In an alternative embodiment, when the active set contains no members, the mobile station only transmits the HCM when it has detected combined pilots in excess of the threshold MIN_TOT_PILOT_EC_I0.

In the preferred embodiment of the present invention, the OFNLM contains an additional parameter referred to herein as the other frequency repeat search time (OF_RPT_SRCH). OF_RPT_SRCH tells the mobile station what period of time it is to wait after having returned to the first frequency F1 before repeating the search of the second frequency system.

Figure 7A:
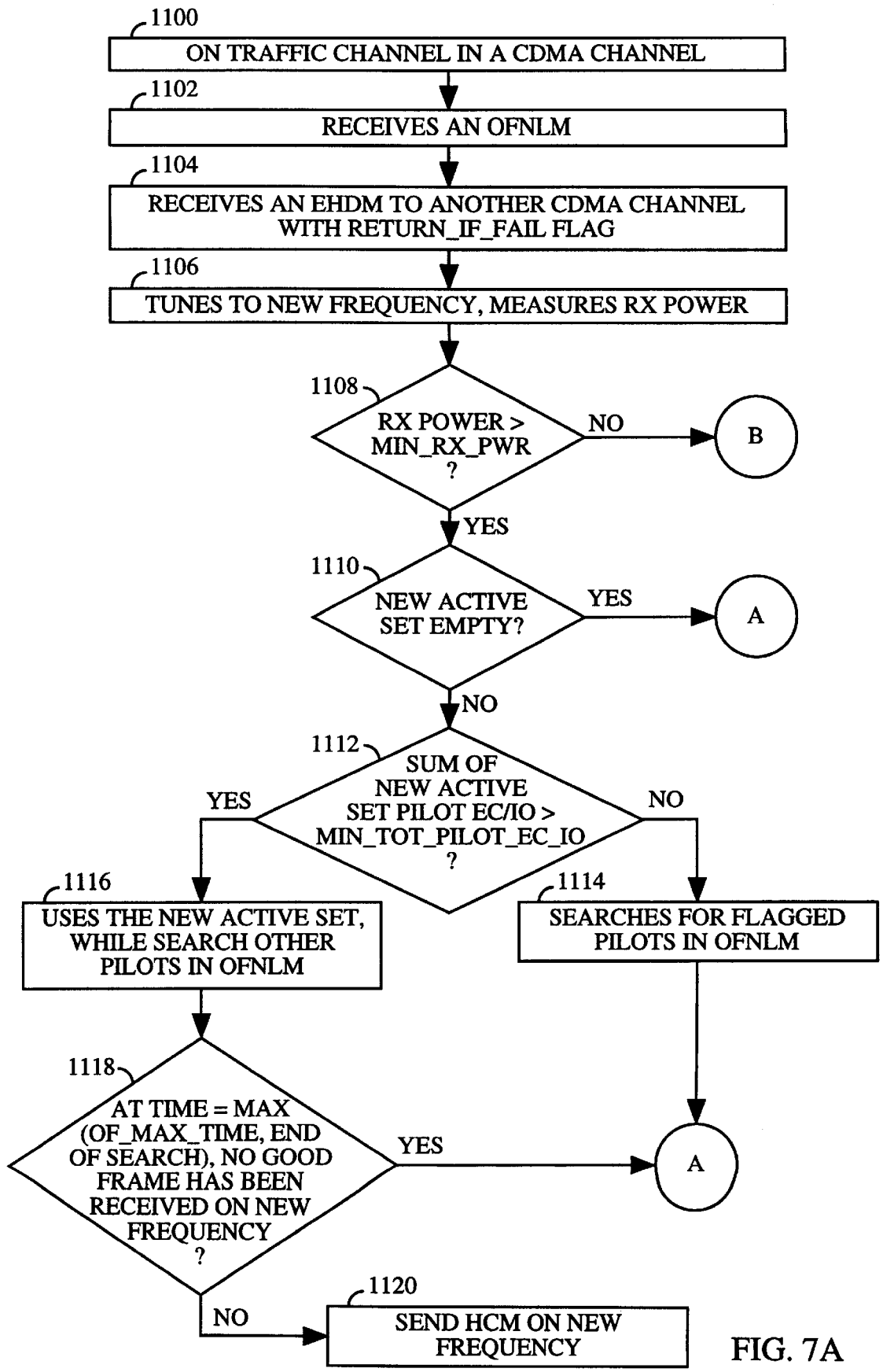
FIGS. 7A–7B are flowcharts illustrating the method for intermittently searching the new system or intermittently attempting handoff to the new system.
Figure 7B:
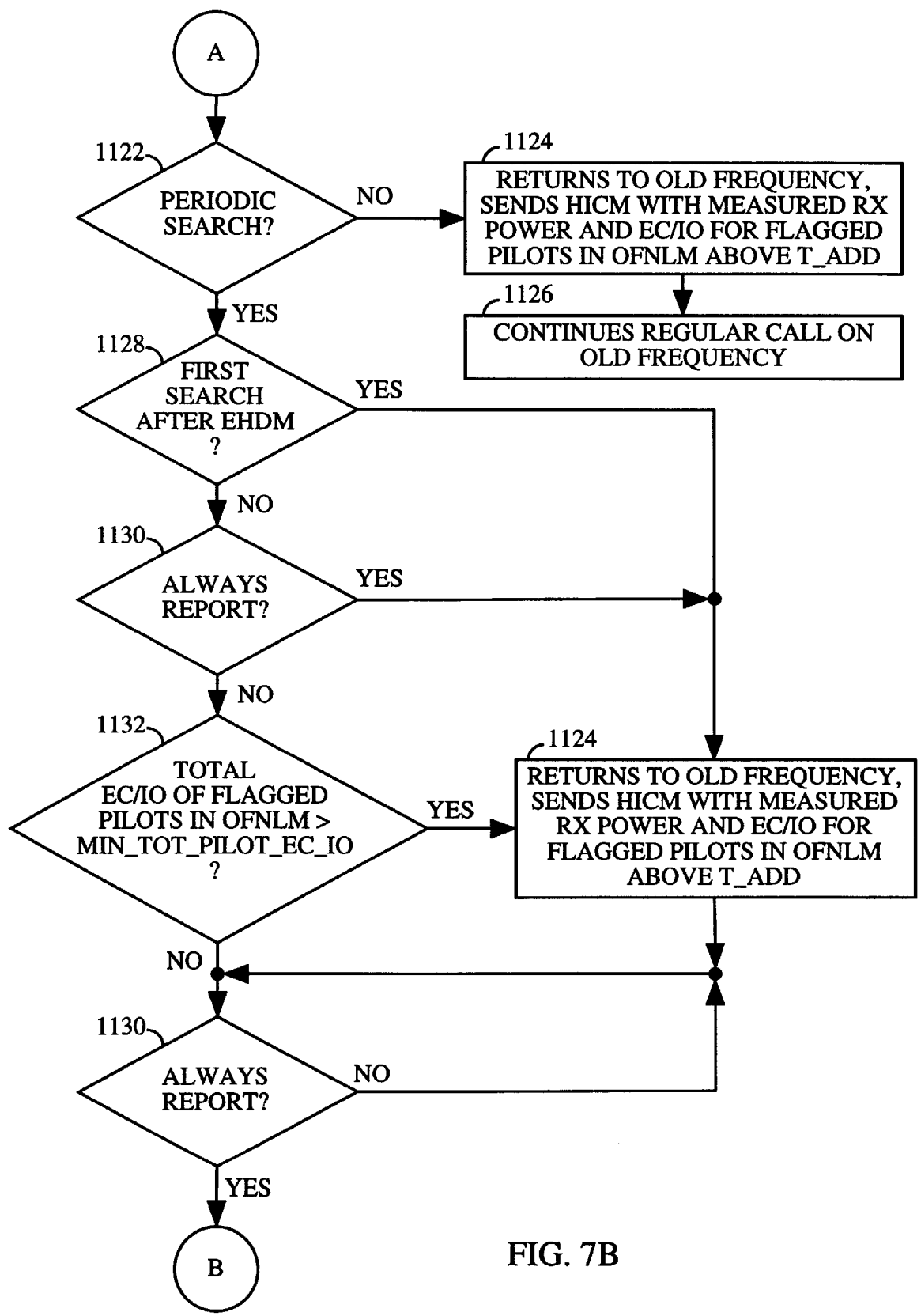

The method for performing the preferred embodiment is illustrated in detail in FIGS. 7A–7B. In block 1100, the mobile station is in communication with the stem F1. In block 1102, the mobile station receives an other frequency neighbor list message (OFNLM). In block 1104, the mobile station receives an extended handoff direction message (EHDM) directing it to another CDMA channel and with the RETURN_IF_FAIL flag set to indicate that the mobile station is to return to the first frequency F1 if the handoff to the new frequency F2 is not completed. In block 1106, the mobile station tunes to the new frequency F2 and measure the receive in band energy. In control block 1108, the mobile station compares the measured received energy to the threshold MIN_RX_PWR. If the measured received power does not exceed the threshold MIN_RX_PWR, then the flow proceeds to block 1122 and the flow proceeds as described later herein.

If the measured received power exceeds the threshold MIN_RX_PWR, then the flow proceed to control block 1110 where the mobile station determines from the extended handoff direction message (EHDM) whether the active set contains any members. If the active set does not contain any members, the flow proceeds to block 1112. In block 1112, the mobile station measures the energy of each of the pilots of the ACTIVE SET, sums their energies and compares the sum to the threshold MIN_TOT_PILOT_EC_I0.

If the sum of measured energies of the pilots of the actives set exceeds the threshold MIN_TOT_PILOT_EC_I0, then the flow moves to block 1116. In block 1116, the mobile station commences communications using the pilots in the new ACTIVE SET and searches the other pilots in the neighbor set specified in the OFNLM. In block 1118, the mobile station waits either a predetermined maximum time period (OF_MAX_TIME) or until all pilots in the OFNLM have been searched, whichever is longer, and determines whether the mobile station has not correctly received a frame in the new system. If the mobile station has received a good frame, then the flow proceeds to block 1120, and the mobile station transmits a handoff complete message to the new system indicating that the handoff was successful. The new system transmits the receipt of the message to the old system and the call is torn down on the old system. If in block 1118, no good frame has been received, then the flow moves to block 1122 and the proceeds as described later herein.

If back in block 1110, the ACTIVE SET specified in the EHDM contains no members, then the flow proceeds to block 1114. Similarly, in block 1112, if the active set specified in the EHDM contains members, but the sum of the energy of the pilots of the ACTIVE SET does not exceed the threshold MIN_TOT_PILOT_EC_I0, then the flow moves to block 1114. In block 1114, the mobile station measures the signal strengths of all pilots to be searched as specified in the OFNLM and the flow proceeds to block 1122.

In block 1122, the mobile station determines whether a periodic search is to be performed. If a periodic search is not to be performed, then the flow moves to block 1124. In block 1124, the mobile station retunes to the old frequency and sends the handoff incomplete message (HICM) which includes the measured received power and the measured $E_c/I_o$ for the pilots flagged to be searched in the OFNLM and the flow proceeds to block 1126. In block 1126, the mobile station resumes communication on the old frequency.

If, in block 1122, the mobile station determines that a periodic search is to be performed, then the flow proceeds to control block 1128. In block 1128, the mobile station determines whether this is the first search of the periodic search. If this is the first search in the periodic search, then the flow proceeds to block 1134. If this is not the first search in the periodic search, then the flow proceeds to block 1130. In block 1130, the mobile station determines whether it is to report after each search or only when it detects combined energies of pilots to be searched in excess of MIN_TOT_PILOT_EC_I0. If the mobile station is to report after every search, the flow moves to block 1134, otherwise the flow moves to block 1132.

In block 1132, the mobile station sums the energy of all pilots which are to be searched in the OFNLM and compares the sum to the threshold MIN_TOT_PILOT_EC_I0. If the sum does not exceed the threshold value, then the flow moves to block 1136. If the sum exceeds the threshold value, then the flow moves to block 1134. In block 1134, the mobile station retunes to the old frequency and transmits a handoff incomplete message including the receive power, and the $E_c/I_o$ for the pilots to be searched which are above the threshold T_ADD, and the flow proceeds to block 1136. In block 1136, the mobile station sets a timer to wait a predetermined period and then the flow moves to block 1106 and proceeds as described previously.

Figure 8:
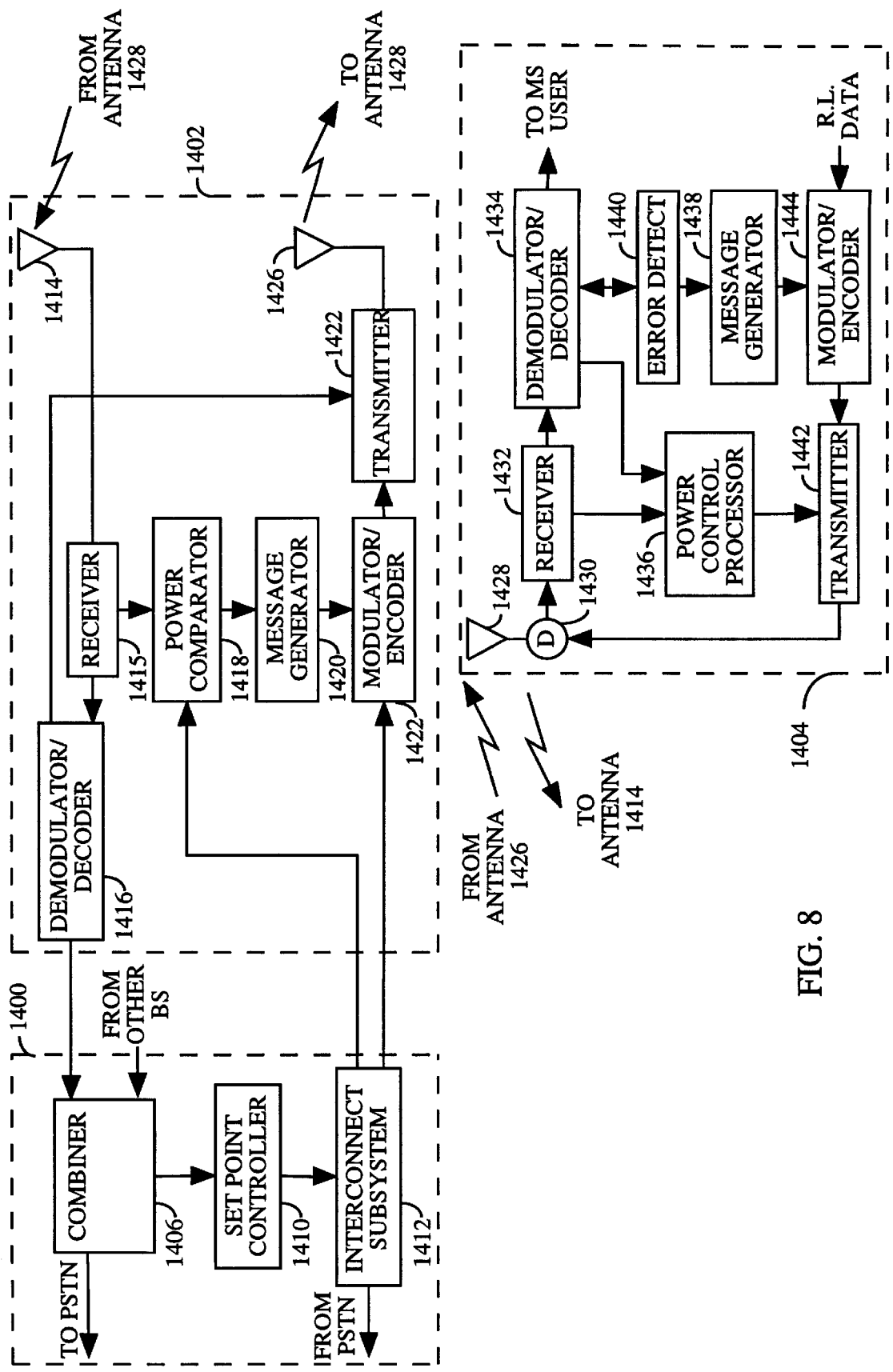
FIG. 8 illustrates the power control system for controlling the transmission power of the mobile station and base station.

While the mobile station is tuned to the new frequency F2, there is a temporary disruption in the control of the transmission power of both the mobile station and the base station. FIG. 8 illustrates the system for controlling the transmission power of the mobile station (reverse link power control) and the system for controlling the transmission power of the base station (forward link power control).

In forward link power control, two methods for controlling the transmission power of the base station are considered. By a first method, the mobile station transmits for each frame received an indication as to whether that frame was received correctly or incorrectly. This indication is referred to as the error indicator bit (EIB). In the exemplary embodiment, the correct receipt of the frame is determined through a set of parity like bits, referred to in the IS-95 standard as cyclic redundancy check (CRC) bits. By a second method, frame error rate statistics are accumulated at the mobile station and a message is transmitted at intervals to tell the base station whether the frame error rate is acceptable or not.

Referring to FIG. 8, a frame of forward link data is received by mobile station 1404 by antenna 1428. The received signal is provided to receiver (RCVR) 1432 which filters, downconverts and amplifies the received signal. The received signal is provided to demodulator/decoder (DEMOD/DEC) 1434, which demodulates the signal and decodes the demodulated signal. The decoded signal is then provided to error detector (ERROR DETECT) 1440, which in the exemplary embodiment determines the presence of a frame error by determining whether the cyclic redundancy bits match for the decoded data that was used to generate them.

Error detector 1440 provides a signal indicating the presence or absence of a frame error to message generator 1438. Message generator 1438 generates the error indicator bit (EIB), in accordance with the error determination, and provides the EIB to modulator/encoder (MOD/ENC) 1444. In the exemplary embodiment, the EIB is incorporated into the header of the outgoing reverse link data frame and the frame is encoded and modulated. The modulated frame is provided to transmitter (TMTR) 1442 where it is upconverted, amplified and filtered and provided through duplexer 1430 for transmission through antenna 1428.

The frame containing the EIB is received at base station 1402 by antenna 1414 and provided to receiver 1415 where the signal is downconverted, filtered and amplified. The received signal is then provided to demodulator/decoder (DEMOD/DEC) 1416 where it is demodulated and decoded. The EIB is separated from the decoded frame and provided to transmitter (TMTR) 1424. Transmitter adjusts its transmit power in accordance with EIB. If the EIB indicates the frame was correctly received, the transmit power of transmitter 1424 is reduced by a predetermined amount. If the EIB indicates the frame was not correctly received, the transmit power of transmitter 1424 is increased by a predetermined amount. The problem is that when the mobile station is tuned to the new frequency (F2), it is not capable of transmitting the EIB to base station 1402.

Figure 9A:
FIGS. 9A–9C are timing diagrams illustrating the problems to the forward link power control caused by the mobile station's tuning to the new frequency.
Figure 9B:
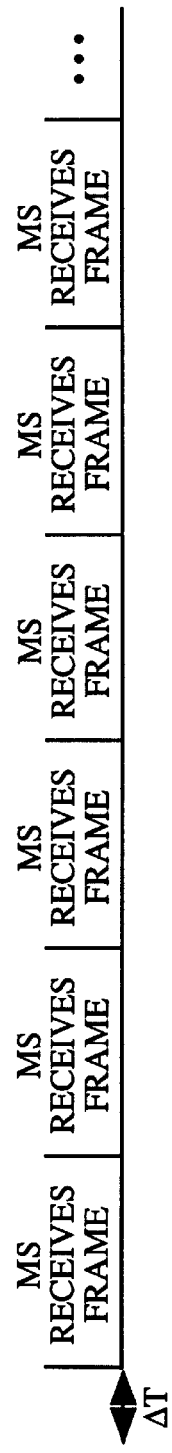
Figure 9C:
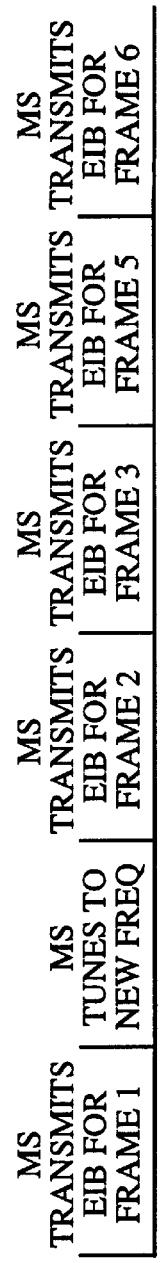

In the present invention the EIB that would have been transmitted during the period when the mobile station is tuned to the new frequency F2 is stored until the mobile station retunes to the old frequency and at that time the EIB is transmitted. FIGS. 9A–9C indicate the timing schedule for the improved forward link power control in view of the mobile station's tuning to the new frequency. For the present example, the mobile station will be assumed to tune to the new frequency, conduct its search or handoff attempt in the new frequency and retune to the old frequency F1 within the time period of one frame of data. Furthermore, the example is illustrated where the demodulation decoding and error detection processes require two frame periods to perform.

The teachings of the present invention can easily be extended to searches and handoff attempts which require more than a frame to be conducted and to systems having different processing delays.

FIG. 9A illustrates the timing of the forward link transmissions. The base station in an uninterrupted fashion transmit its consecutive frames of forward link data to the mobile station. As show in FIG. 9B, a short time period of time (Δt) from the time each of the frames is transmitted, they are received by the mobile station. At the time period in which the mobile station would receive the forward link frame 4, the mobile station tunes to frequency F2 to perform the search or handoff attempt. During this period it is incapable of receiving frame 4 and so cannot determine whether the frame would have been received properly had the mobile station been tuned to the old frequency.

As shown in FIG. 9C, after receiving each frame of data there is a two frame processing delay before the mobile station is able to transmit the EIB for the received frame back to the base station. During the time period in which the mobile station is tuned to frequency F2, it is prepared to transmit the EIB for received frame 2 but because it is not tuned to the old frequency F1, it is incapable of transmitting the EIB for frame 2. In the present invention, the mobile station waits until it is retuned to the old frequency and then transmits the EIB for frame 2. The EIB for frame 3 is then transmitted with the next reverse link frame. Then, the EIB for frame 5 is transmitted, since no EIB could be determined to frame 4. After this the transmission of EIBs proceeds normally. Thus, the present invention has made the EIB for frame 2 available to the base station where otherwise it would have been lost due to the tuning to the new frequency.

In an alternative embodiment of forward link power control, the mobile station does not transmit an EIB every frame. Rather the mobile station accumulates a frame error rate measurement over a predetermine number of frames and sends an indication of whether the frame error rate exceeds a predetermined threshold rate. In the present invention, two alternative embodiments are disclosed for handling the determination of the frame error rate in view of the tuning to the new frequency which can distort the statistic. In a first embodiment, the mobile station simply counts the frame which was not received due to the tuning to the new frequency as a correctly received frame. Thus, during the time period in which the mobile station is retuned to the new frequency error detect 1440 is instructed to count frames not received during the tuning to the new frequency as correctly received frames. Alternatively, the accumulation interval can be adjusted so as not to include the time period when the mobile station is tuned to the new frequency.

Regarding the reverse link power control, the transmission power of the mobile station is controlled in a closed loop fashion by comparing the received energy of a group of symbols in the reverse link frame to a threshold value. If the received energy of a group of symbols is less then the threshold value, the mobile station is instructed to increase its transmission power. If received energy of a group of symbols is above the threshold value, the mobile station is instructed to decrease its transmission power.

Referring to FIG. 8, the energy of the group of symbols is provided from receiver 1415 to power comparator 1418. Power comparator 1418 compares the energy against a threshold value and provides the result of the comparison to message generator (MSG GENERATOR) 1420. Message generator 1422 generates the appropriate indicator to control the transmission power of the mobile station and provides the indicator to modulator encoder (MOD/ENC) 1422. The indicator is punctured into the outgoing data stream, modulated and encoded and sent to mobile station 1404 in the forward link data.

The forward link data is received by antenna 1428, and provided through duplexer 1430 to 1430 to receiver 1432 which downconverts, filters and amplifies the received signal and provides the received signal to demodulator/decoder 1434. Power control bits are removed from the decoded data stream and provided to power control processor 1436. Power control processor 1436 determines the transmission power of transmitter 1442 in accordance with the received power control bits. Power control processor 1436 provides the determined transmission power to transmitter 1442 which adjust its gain in accordance with the determined power level.

Figure 10A:
FIGS. 10A–10D are timing diagrams illustrating the problems to the reverse link power control caused by the mobile station's tuning to the new frequency.
Figure 10B:
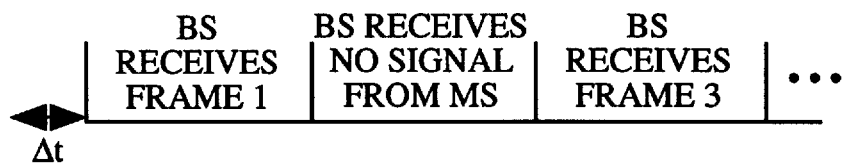

The problem that arises is that while the mobile station is tuned to the new frequency, base station 1402 will not detect its signal and in response will generate a series of power control bits instructing mobile station 1404 to increase its transmission power. This problem is illustrated in FIGS. 10A–10D. In FIG. 10A, the reverse link frames transmitted by the mobile station are consecutively transmitted. However, during the period in which frame 2 is to be transmitted on the reverse link, the mobile station tunes to the new frequency and performs the handoff attempt or pilot search. In FIG. 10B, the base station receives the reverse link frames a short time interval Δt later.

Figure 10C:
Figure 10D:
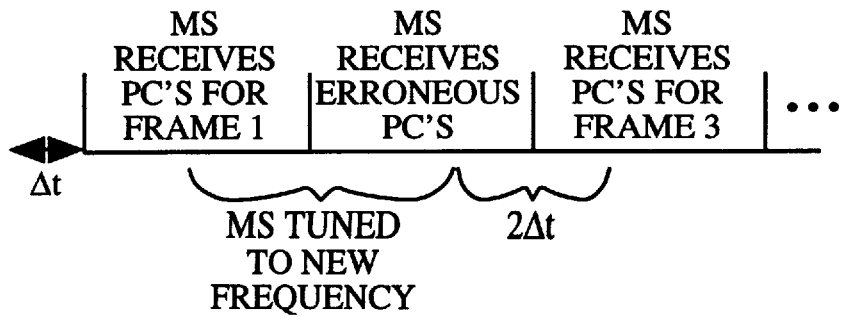

As shown in FIG. 10C, during the time period between receiving frame 1 and frame 3, the base station detects no signal from the mobile station and in response generates a set of erroneous power control bits which it transmits to the mobile station. As shown in FIG. 10D, the power control commands are received Δt later. As shown in FIG 10D, the majority of erroneous power control commands are not received by the mobile station because during the time period in which they would be received the mobile station is tuned to the new frequency. However, during a time period approximately equal to twice Δt following the mobile station's retuning to the old frequency F1, the mobile station is receiving the erroneously generated power control bits. In the present invention the mobile station is inhibited from responding to power control bits which it receives for a time period approximately equal to twice Δt following the mobile station's retuning to the old frequency F1.

The comparison threshold against which the received reverse link symbol energy is compared is determined in accordance with the received frame error rate. Referring to FIG. 8, combiner 1406 determines either an improved frame estimate from the frame estimates provided by each of the base stations in communication with mobile station 1402 or declares a frame erasure. Combiner 1406 provides to set point controller 1410 an indication of whether a frame estimate of sufficient confidence has been generated or whether a frame erasure must be declared. If the frame error rate is too high the received symbol energy threshold is increased and if the frame error rate is too low the received symbol energy threshold is decreased. The threshold is provided by set point controller 1410 to interconnect subsystem 1412 which provides the threshold value or values to power comparator 1418 of each of the base stations in communication with mobile station 1404.

The problem that arises when the mobile station tunes to the new frequency is that this causes an increase in the frame error rate which can cause an unnecessary decrease in the received symbol energy threshold. The present invention proposes two methods for handling this problem. By the first method, the acceptable frame error rate is modified in set point controller 1410 to take into account that portion of the frame error rate that is a result of the tuning to the new frequency F2. For example, if the mobile station is to tune to the new frequency for one frame every 100 frames, then this would increase the received frame error rate by 1%. Thus, the set point controller would increase the value by which it determines whether the frame error rate is acceptable by 1%. In an alternative embodiment, the selector can train itself to identify when the mobile station has tuned to the new frequency and to identify the detected errors resulting therefrom. Since the tuning to the new frequency is at systematic intervals, selector 1400 can determine when frame errors resulting from tuning to the new frequency result and can ignore these frame errors in the determination of the set point.

In addition to closed loop control of the transmission power of mobile station 1404, there is an open loop control by which the mobile station measures the received forward link energy and adjusts its transmission energy accordingly. As shown in FIG. 8, the received forward link energy is provided from receiver 1432 to power control processor 1436 and the determination is made based upon both the closed loop commands and the measured forward link signal strength.

The problem that arises is that when the mobile station tunes to the new frequency and provides the received in band energy to the power control processor 1436, the energy value provided has no relevance to the control of the reverse link signal in the old system since the old system is not the source of the received energy. In the present invention the power control processor is inhibited from basing it determination of the transmission energy upon the received energy of the new system F2.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for avoiding a loss of communication with a mobile station in a wireless communication system wherein the mobile station is moving from an area covered by an origination system into an area covered by a destination system and wherein the mobile station has attempted to acquire said destination system and has failed, the method comprising:

transmitting from said mobile station to said origination system a set of parameter data;

receiving at said origination system said parameter data;

generating at said origination system a search list in accordance with said parameter data;

attempting by said mobile station to acquire said destination system in accordance with said search list;

waiting a predetermined time interval after unsuccessfully attempting to acquire said destination system; and re-attempting by said mobile station to acquire said destination system following said step of waiting a predetermined time interval.

2. The method as recited in claim 1 further comprising the step of measuring said parameter data at said mobile station.

3. The method as recited in claim 2, wherein said step of measuring said parameter data comprises measuring signal energy from pilot signals of said destination system.

4. The method as recited in claim 2, wherein said step of measuring said parameter data is performed in accordance with a predetermined set of search parameters.

5. The method as recited in claim 4, wherein said predetermined set of search parameters is transmitted to said mobile station by said origination system.

6. The method as recited in claim 1 further comprising transmitting said search list from said origination system to said mobile station.

7. The method as recited in claim 1, wherein said step of re-attempting to acquire said destination system is performed in accordance with said search list.

8. The method as recited in claim 1, wherein said origination system and said destination system operate in different frequency bands.

9. The method as recited in claim 1 further comprising the step of indicating whether to revert to the origination system if a handoff to the destination system is not completed.

10. The method as recited in claim 1 further comprising the step of determining whether a bit associated with each identified base station within said destination system is set, and searching for a pilot signal associated with each identified base station for which the bit is set.

11. The method as recited in claim 1 further comprising the step of providing control data which comprises a list of cells within said destination system to be searched which are currently set up to transmit data to the mobile station.

12. The method as recited in claim 9 further comprising the step of reconnecting to the origination system if said step of re-attempting to acquire said destination system is unsuccessful.

13. The method as recited in claim 12 further comprising the step of storing at least one error indicator bit used when the mobile station is tuned to the destination system for transmission when the mobile station reverts to the origination system.

14. The method as recited in claim 12 further comprising the step of inhibiting response to power control bits received for a time period following the step of reconnecting to the origination system.

15. A method of providing handoff for wireless communication wherein a mobile station is moving from an area covered by an origination system to an area covered by at least one destination system, comprising:

predicting first destination systems by the origination system;

attempting by the mobile station to connect to said first destination systems;

waiting a predetermined time interval after unsuccessfully attempting to connect to said first destination systems;

searching for alternate destination systems following said step of waiting a predetermined time interval; and attempting to connect the mobile station to said alternate destination systems located by said searching.

16. The method as recited in claim 15 further comprising the step of measuring by the mobile station of a minimum primary signal from said first destination systems.

17. The method as recited in claim 16, wherein said step of attempting to connect to said first destination systems is based on locating said minimum primary signal.

18. The method as recited in claim 16, wherein said minimum primary signal is a pilot signal.

19. The method as recited in claim 15, wherein said step of searching for alternate destination systems comprises measuring by the mobile station of a minimum secondary signal.

20. The method as recited in claim 19, wherein said step of attempting to connect the mobile station to said alternate destination systems is based on locating said minimum secondary signal.

21. The method as recited in claim 19 further comprising the step of reconnecting to the origination system if said step of attempting to connect the mobile station to said alternate destination systems is unsuccessful.

22. The method as recited in claim 21, wherein said step of reconnecting to the origination system is based on a failure to locate said minimum secondary signal.

23. The method as recited in claim 19, wherein said minimum secondary signal is a power signal.

24. The method as recited in claim 15 further comprising the step of receiving by the mobile station a search list of first destination systems based on said predicting of first destination systems by the origination system.

25. The method as recited in claim 15 further comprising the step of predicting said alternate destination systems by the origination system.

26. The method as recited in claim 25 further comprising the step of receiving by the mobile station a search list of alternate destination systems based on said predicting of alternate destination systems by the origination system.

27. The method as recited in claim 15, wherein said origination system operates in a different frequency band than said first destination systems and said alternate destination systems.

28. The method as recited in claim 15 further comprising the step of reconnecting to the origination system if said step of attempting to connect the mobile station to said alternate destination systems is unsuccessful.

29. The method as recited in claim 15 further comprising the step of indicating whether to revert to the origination system if a handoff to said alternate destination systems is not completed.

30. The method as recited in claim 15 further comprising the step of determining whether a bit associated with each identified base station within said first destination systems is set, and searching for a pilot signal associated with each identified base station for which the bit is set.

31. The method as recited in claim 15 further comprising the step of providing control data which comprises a list of cells within said first destination systems to be searched which are currently set up to transmit data to the mobile station.

32. The method as recited in claim 28 further comprising the step of storing at least one error indicator bit used when the mobile station is tuned to the alternate destination systems for transmission when the mobile station reverts to the origination system.

33. The method as recited in claim 28 further comprising the step of inhibiting response to power control bits received for a time period following the step of reconnecting to the origination system.

34. A wireless communication system that avoids a loss of communication wherein a mobile station is moving from an area covered by an origination system into an area covered by a destination system and wherein the mobile station has attempted to acquire said destination system and has failed, the system comprising:

a transmitter for transmitting from said mobile station to said origination system a set of parameter data;

a receiver for receiving at said origination system said parameter data;

a search list generated at said origination system in accordance with said parameter data, wherein said mobile station attempts to acquire said destination system in accordance with said search list; and means for waiting a predetermined time interval after unsuccessfully attempting to acquire said destination system, wherein said mobile station re-attempts to acquire said destination system following said predetermined time interval.

35. A wireless communication system wherein a mobile station is moving from an area covered by an origination system to an area covered by at least one destination system, comprising:

means for predicting first destination systems by the origination system, wherein said mobile station attempts to connect to said first destination systems;

means for waiting a predetermined time interval after unsuccessfully attempting to connect to said first destination systems; and means for searching for alternate destination systems following said predetermined time interval, wherein the mobile station attempts to connect to said alternate destination systems located by said means for searching.

* * * * *